(12) United States Patent
Saigusa

(10) Patent No.: US 11,281,411 B2
(45) Date of Patent: Mar. 22, 2022

(54) PRINTING APPARATUS DETERMINES USER INFORMATION ATTACHED TO PRINT DATA AND RETURNS AN AUTHENTICATION FAILURE RESPONSE TO INFORMATION PROCESSING APPARATUS, METHOD FOR CONTROLLING PRINTING APPARATUS, SERVER SYSTEM, AND PROGRAM

(71) Applicant: CANON KABUSHIKI KAISHA, Tokyo (JP)

(72) Inventor: Hirokazu Saigusa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/909,455

(22) Filed: Jun. 23, 2020

(65) Prior Publication Data
US 2020/0409624 A1    Dec. 31, 2020

(30) Foreign Application Priority Data

Jun. 25, 2019 (JP) .............................. JP2019-117110

(51) Int. Cl.
*G06F 3/12* (2006.01)
*G06F 21/31* (2013.01)
*G06F 21/60* (2013.01)

(52) U.S. Cl.
CPC .......... *G06F 3/1222* (2013.01); *G06F 3/1204* (2013.01); *G06F 3/1238* (2013.01); *G06F 3/1255* (2013.01); *G06F 21/31* (2013.01); *G06F 21/608* (2013.01); *G06F 3/1259* (2013.01)

(58) Field of Classification Search
None
See application file for complete search history.

(56) References Cited

U.S. PATENT DOCUMENTS

| 8,031,348 B2* | 10/2011 | Wang ................... | H04N 1/4426 358/1.14 |
|---|---|---|---|
| 2011/0203005 A1* | 8/2011 | Hamada ................ | G06F 21/608 726/28 |
| 2012/0120437 A1* | 5/2012 | Nanaumi .............. | G06F 3/1257 358/1.15 |
| 2013/0326227 A1* | 12/2013 | Asano .................... | H04L 63/08 713/181 |
| 2014/0211240 A1* | 7/2014 | Maki ...................... | H04N 1/444 358/1.14 |

(Continued)

FOREIGN PATENT DOCUMENTS

| JP | 2012-94113 A | 5/2012 |
|---|---|---|
| JP | 2013-187571 A | 9/2013 |

*Primary Examiner* — Haris Sabah
(74) *Attorney, Agent, or Firm* — Canon U.S.A., Inc. IP Division

(57) ABSTRACT

A printing apparatus transmits user information and print data to a server system. The printing apparatus includes a reception unit and a control unit. The reception unit receives print data from an information processing apparatus. The control unit returns a response indicating authentication failure to the information processing apparatus when user information is not attached to the print data received, and transmits the print data to the server system when user information is attached to the print data.

10 Claims, 11 Drawing Sheets

(56) References Cited

U.S. PATENT DOCUMENTS

| | | | | |
|---|---|---|---|---|
| 2014/0376027 A1* | 12/2014 | Adachi | ............. | G06K 15/4095 |
| | | | | 358/1.14 |
| 2016/0070509 A1* | 3/2016 | Takahira | ............ | H04N 1/00307 |
| | | | | 358/1.15 |
| 2016/0154615 A1* | 6/2016 | Yamamoto | ............ | G06F 3/1238 |
| | | | | 358/1.14 |
| 2017/0286031 A1* | 10/2017 | Matsui | .................. | G06F 3/1268 |

* cited by examiner

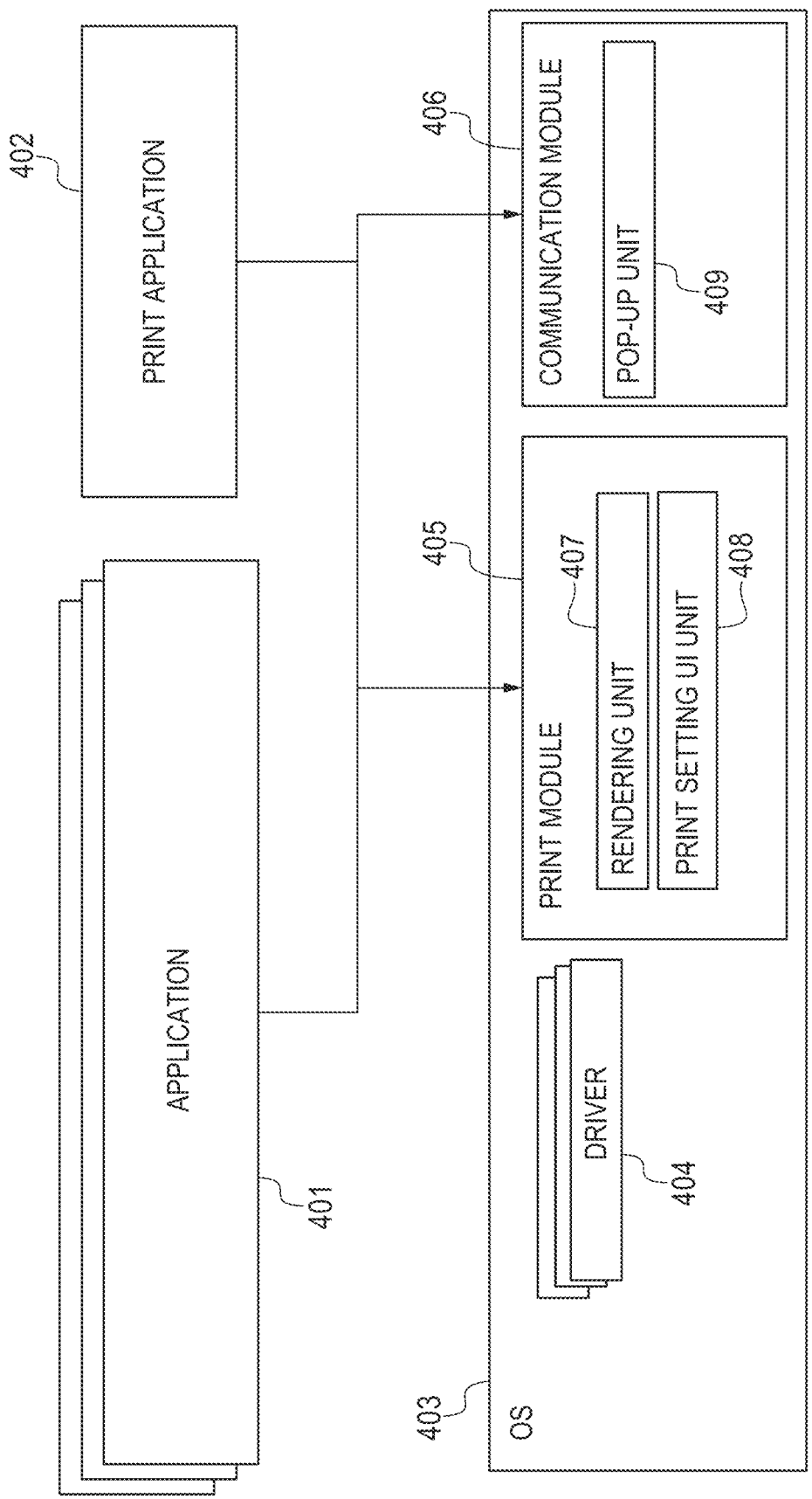

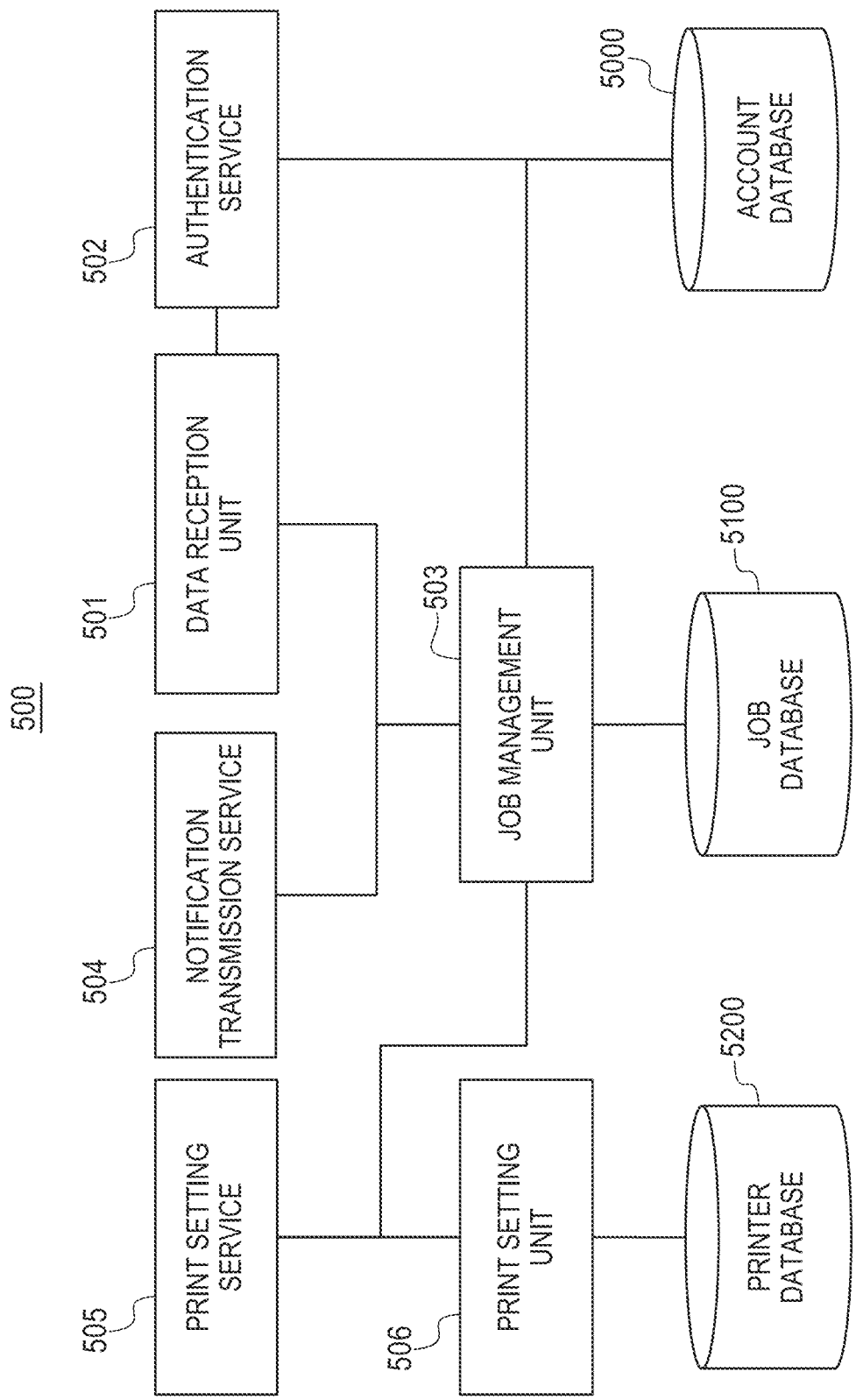

FIG. 10A

```
Header
    Post : xxxxx HTTP/1.1
    ...<omitted>...                                    } 1001

Body
    "Create-Job" ;
        OperationAttributes =   (
            {
                "attributes-charset" = "utf-8" ;
                "attributes-natural-language" = en;
                "printer-uri" = "ipp://xxxx.local.:631/ipp/print";
                ...<omitted>...
            }
        );                                              } 1002

JobAttributes = (
            "output-bin" = "auto"
                "copies-supported" = "1"
                ...<omitted>...
        );
```

FIG. 10B

```
Header
    HTTP/1.1  401 Unauthorized
    ...<omitted>...                                    } 1011

Body
    ...<omitted>...
```

FIG. 10C

```
Header
    Post : xxxxx HTTP/1.1
    ...<omitted>...
    Authentication :
        username : XXXXX
        password : YYYYY
        ...<omitted>...                                } 1021

"Create-Job" ;
    OperationAttributes =   (
        {
            "attributes-charset" = "utf-8" ;
            "attributes-natural-language" = en;
            "printer-uri" = "ipp://xxxx.local.:631/ipp/print";
        }
    );

JobAttributes = (
        "output-bin" = "auto"
            "copies-supported" = "1"
            ...<omitted>...
    );
```

PRINTING APPARATUS DETERMINES USER INFORMATION ATTACHED TO PRINT DATA AND RETURNS AN AUTHENTICATION FAILURE RESPONSE TO INFORMATION PROCESSING APPARATUS, METHOD FOR CONTROLLING PRINTING APPARATUS, SERVER SYSTEM, AND PROGRAM

BACKGROUND

Field

One disclosed aspect of the embodiments relates to a printing apparatus, a server system, a method for controlling a printing apparatus, a method for controlling a server system, and a program.

Description of the Related Art

There are printing apparatuses that receive print data from an information processing apparatus over a network and perform printing. Generally, to use such a printing apparatus through an information processing apparatus, a specific printer driver corresponding to the printing apparatus is installed into an OS (operating system) running on the information processing apparatus.

In recent years, print systems that use a specific protocol to allow print data to be generated and transmitted to a printing apparatus without the use of a printer driver have been introduced into OSs. For example, print systems have been introduced that support AirPrint™ of Apple Inc. or that support Mopria™ installable into Android™ of Google LLC and Windows™ of Microsoft Corporation. In such a print system, there is no need to install a printer driver corresponding to a printing apparatus into an OS, and the OS performs all the tasks of generating a print job and transmitting the print job to the printing apparatus. AirPrint™ is part of the functions of the OS.

The print system as above implements a network protocol (IPP: Internet Printing Protocol) for transmitting print data to the printing apparatus and causing the printing apparatus to perform printing. According to the IPP, the printing apparatus and the information processing apparatus communicate with each other to realize a print process.

Japanese Patent Application Laid-Open No. 2013-187571 describes a technique as follows. When an image on the screen of a mobile communication terminal device is selected to instruct printing, the device searches for nearby printing apparatuses with NFC communication and displays a list of printing apparatuses found. Based on protocol information obtained from a printing apparatus selected from the list, an appropriate protocol for transmitting image data is selected. Image data to be printed is then transmitted to the printing apparatus.

One conventional print method using a printer driver is pull printing, in which print data is temporarily accumulated in a server and a printer obtains data in the server and performs printing. Japanese Patent Application Laid-Open No. 2012-94113 describes a technique as follows. Print jobs generated with a printer driver are accumulated in a server on a user basis, and in response to a user's login to the server through a printer, the printer obtains the user's job in the server and performs printing.

However, some of OSs and print systems capable of IPP printing as above do not support IPP attributes for user identification. When printing is instructed on such an OS that does not support the IPP attributes for user identification and a server accumulates a print job, the server cannot identify the user corresponding to the print job.

SUMMARY

An aspect of the embodiments is a printing apparatus that transmits user information and print data to a server system. The printing apparatus includes a reception unit and a control unit. The reception unit receives print data from an information processing apparatus. The control unit returns a response indicating authentication failure to the information processing apparatus when user information is not attached to the print data received, and transmits the print data to the server system when user information is attached to the print data.

Further features of the disclosure will become apparent from the following description of exemplary embodiments with reference to the attached drawings.

BRIEF DESCRIPTION OF THE DRAWINGS

FIG. 4 is a diagram illustrating an exemplary software configuration of a terminal.

FIG. 5A is a diagram illustrating an exemplary software configuration of a cloud service.

FIGS. 10A, 10B and 10C are diagrams illustrating exemplary packet structures used in printing in the embodiment.

DESCRIPTION OF THE EMBODIMENTS

Preferred embodiments of the disclosure will now be described in detail in accordance with the accompanying drawings. An embodiment for implementing the disclosure will be described below with reference to the drawings. The following embodiment is not intended to limit the disclosure set forth in the claims, and not all combinations of the features described in the embodiment are essential to the solution of the disclosure.

First Embodiment

Figure 1:
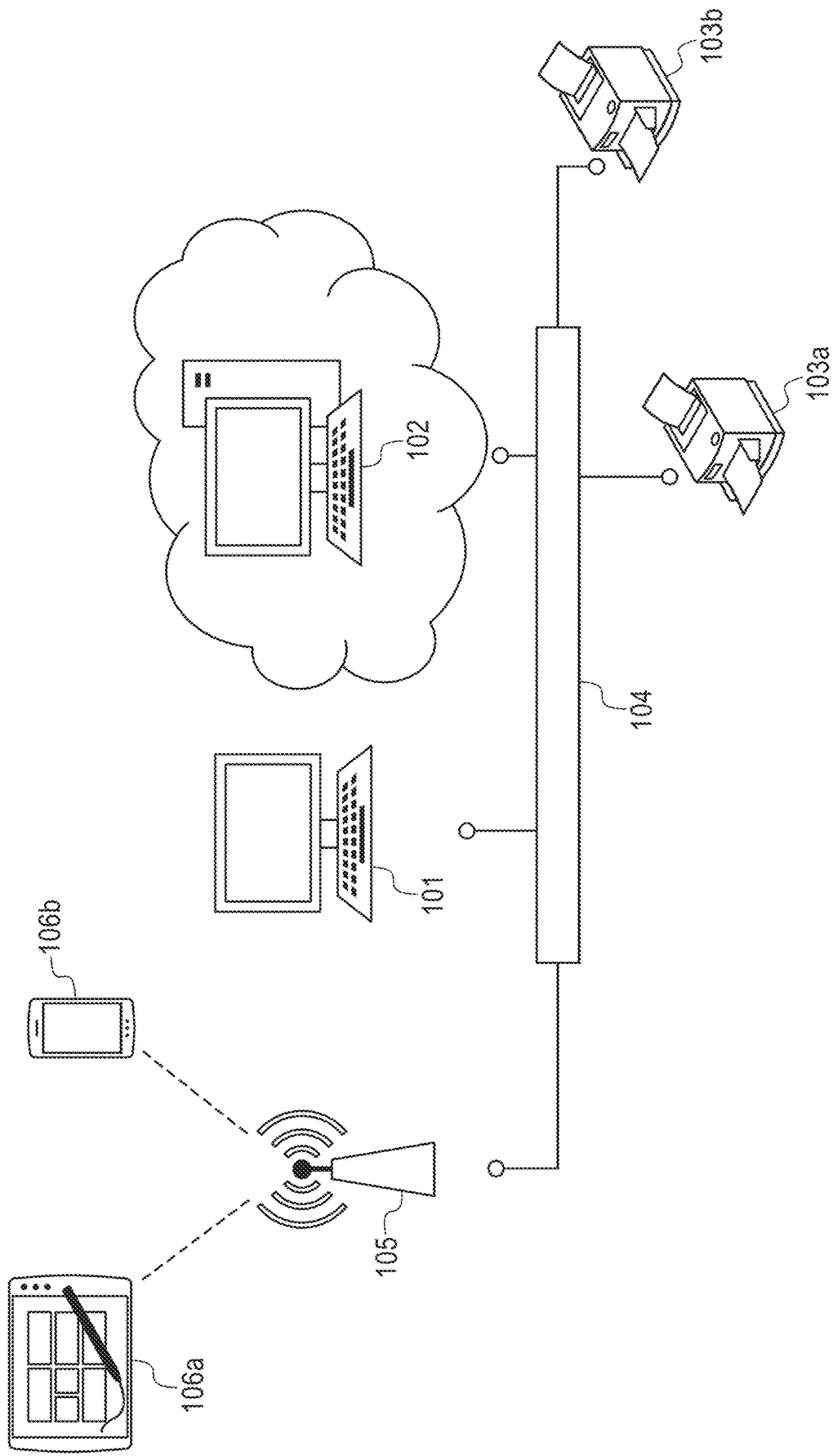
FIG. 1 is a diagram illustrating an exemplary configuration of a print system representing an embodiment.

With reference to FIG. 1, the configuration of a print system in an embodiment will be described below.

FIG. 1 is a diagram illustrating an exemplary configuration of a print system representing an embodiment.

The print system in this embodiment includes: a client computer 101 as an exemplary information processing apparatus; a cloud server 102; and printers (printing apparatuses) 103 that receive print data in PDL (page description language) format and performs printing. In the example in FIG.

1, two printers 103a and 103b are shown in order to illustrate the existence of multiple printers in a network.

The apparatuses in this print system can communicate with each other over a network 104 including a WAN (wide area network). Information processing apparatuses such as a tablet terminal 106a and a smartphone terminal 106b are also connected to the network 104 via an AP (access point) 105. Communication via the AP 105 is wireless communication compliant with, for example, the IEEE (Institute of Electrical and Electronics Engineers) 802.11 series. The terminals 106 may be communication apparatuses other than tablet terminals and smartphones.

The printers 103 may be single-function printers with only a print function or may be multi-function printers with a print function, a scan function, and a copy function. Not only one but multiple client computers 101 may be connected to the network 104. The client computer 101 and the terminals 106 can transmit print data to the printers 103.

As will be described in detail below, the printers 103 are printing apparatuses that transmit print data along with user information to the cloud server 102. The cloud server 102 is a server system that can accept, from a user corresponding to user information attached to print data received from any of the printers 103, modifications to the print settings for the print data. The cloud server 102 may be implemented as multiple computers or a single computer.

Figure 2:
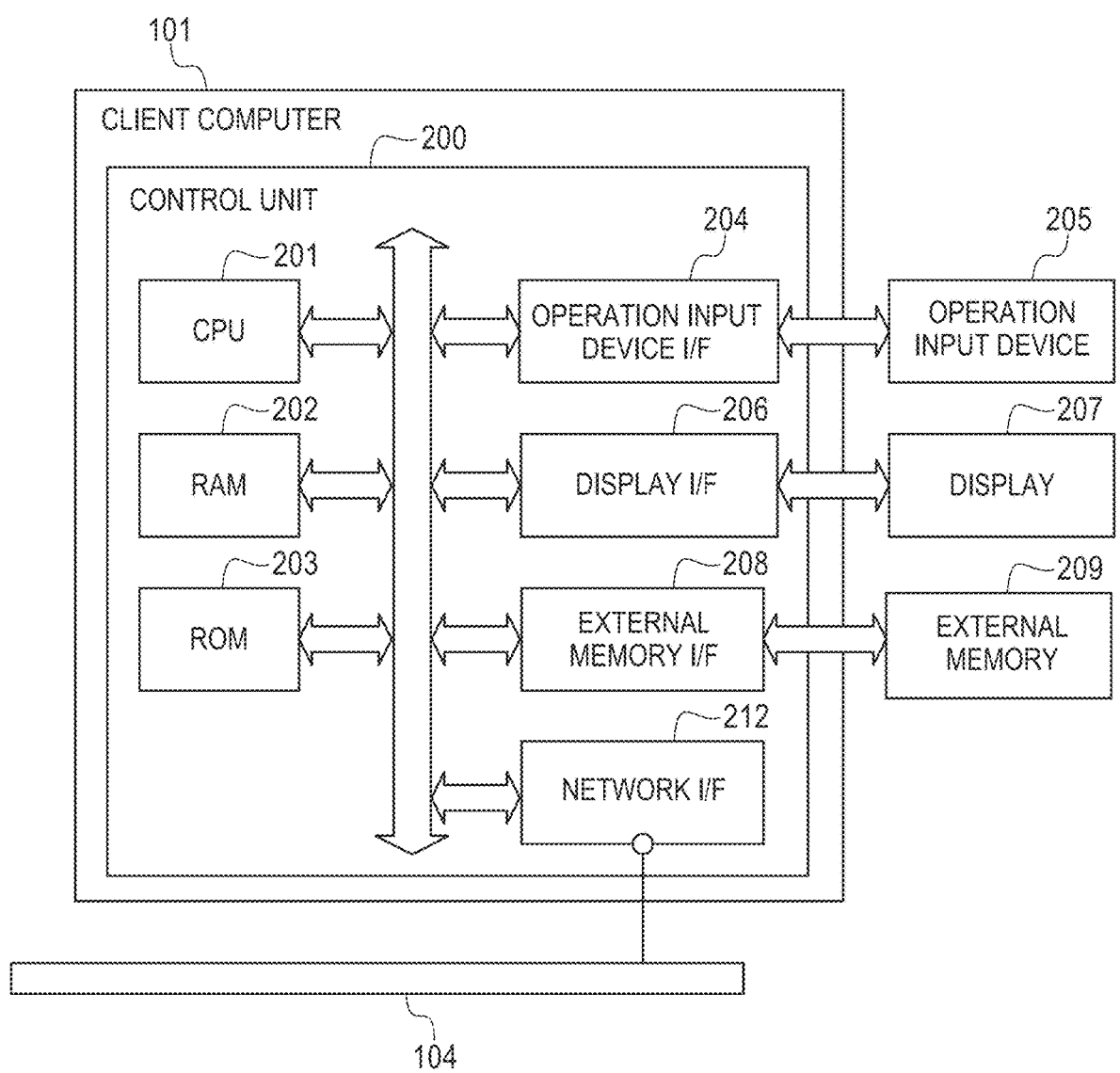
FIG. 2 is a block diagram illustrating an exemplary hardware configuration of a client computer.

FIG. 2 is a block diagram illustrating an exemplary hardware configuration of the client computer 101.

The client computer 101 includes a CPU (central processing unit) 201, a RAM (random access memory) 202, an external memory 209, and a ROM (read only memory) 203.

A control unit 200 that includes the CPU 201 controls the operation of the entire client computer 101. The CPU 201 loads programs stored in the ROM 203 or the external memory 209 into the RAM 202 and executes the programs to perform various sorts of control, such as controlling a UI (user interface) screen, generating print data, and transferring print data.

The ROM 203 stores programs executable by the CPU 201, such as control programs and a boot program. The RAM 202 is the main memory for the CPU 201 and is used as a work area or as a temporary storage area for loading programs.

The external memory 209, which is connected to the control unit 200 via an external memory I/F (interface) 208, stores programs such as applications and an OS (operating system). Although this embodiment assumes that the external memory 209 is an auxiliary storage device such as an HDD (hard disk drive), nonvolatile memory such as an SSD (solid state drive) may be used instead of or in addition to the HDD.

Thus, the hardware such as the CPU 201, the RAM 202, the ROM 203 and the external memory 209 constitute what is called a computer.

An operation input device I/F 204 is an interface that controls an operation input device 205 such as a keyboard, a pointing device (a mouse), or a touch input device. The operation input device 205 functions as a reception unit that receives a user's operations.

A display I/F 206 controls screen display on a display 207. The display 207 functions as a display unit that displays information to the user.

The control unit 200 is connected to the network 104 via a network I/F 212. The network I/F 212 transmits print data to the printers 103 in the network 104, and receives applications and a printer driver from servers in the network 104. Data communication with external terminals in the network 104 is, for example, wireless communication compliant with the IEEE 802.11 series, communication based on a mobile communication system such as LTE (Long-Term Evolution) or 5G (5th Generation), or wired communication through cables such as LAN (Local Area Network) cables.

The computer(s) that constitutes the cloud server 102 also has a hardware configuration similar to the hardware configuration of the client computer 101. The terminals 106 have a configuration similar to the configuration of the client computer 101, except that the operation input device 205, the display 207, and the external memory 209 are integrated into the terminals 106.

Figure 3:
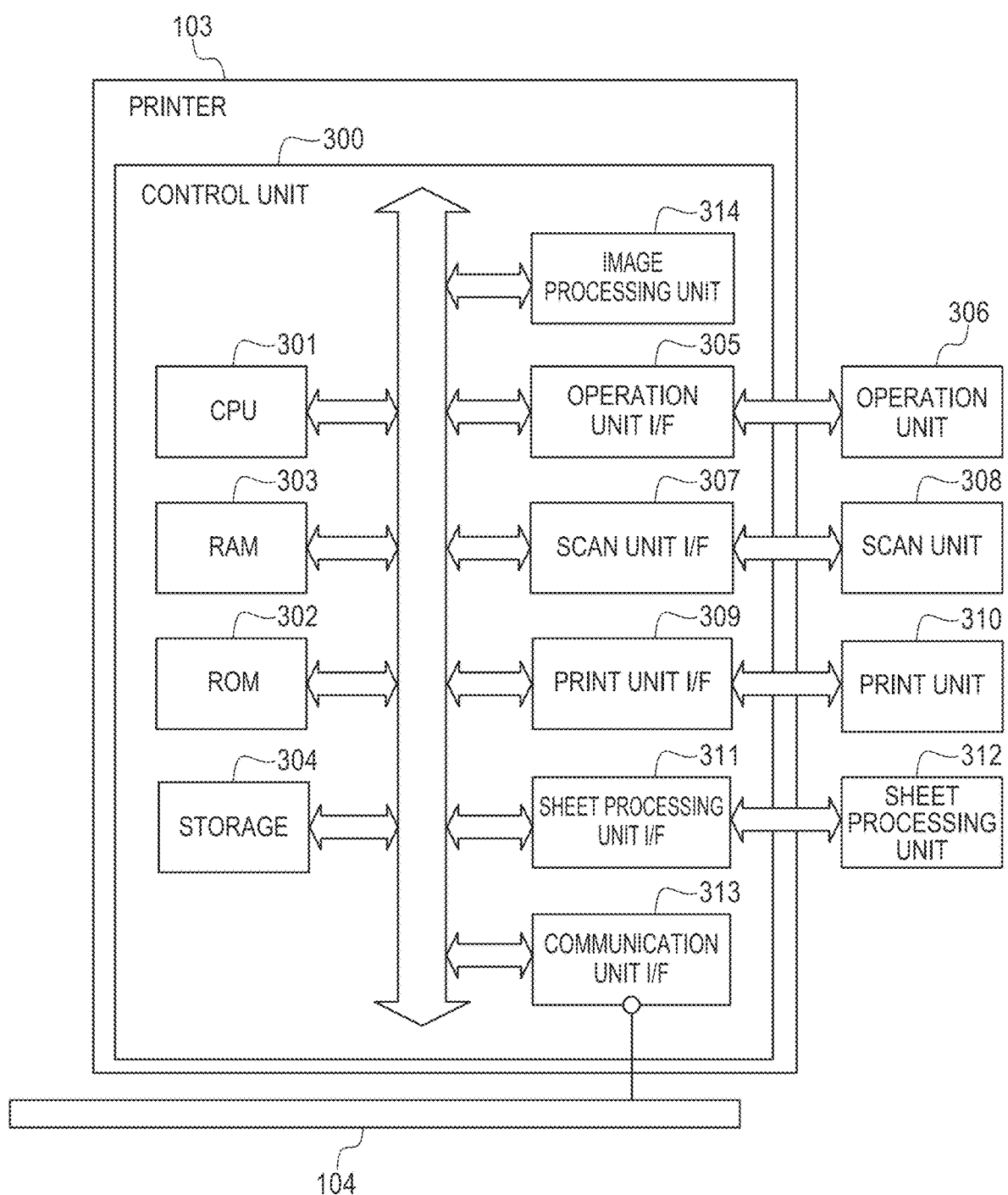
FIG. 3 is a diagram illustrating an exemplary hardware configuration of a printer.

FIG. 3 is a block diagram illustrating an exemplary hardware configuration of each printer 103.

The printer 103 has a scan function for scanning an image on a sheet, and a print function for printing an image onto a sheet. The printer 103 also has other functions, such as a file transmission function for transmitting an image to an external communication apparatus. Although this embodiment describes the printer 103 with the scan function, the print function, and the file transmission function as an exemplary printing apparatus, this is not limiting. For example, the printing apparatus may be an SFP (single function peripheral) without the scan function.

A control unit that includes a CPU 301 controls the operation of the entire printer 103. The CPU 301 reads control programs stored in a ROM 302 or a storage 304 and performs various sorts of control, such as print control and scan control. The ROM 302 stores control programs executable by the CPU 301. A RAM 303 is the main memory for the CPU 301 and is used as a work area or as a temporary storage area for loading various control programs.

The storage 304 stores print data, image data, various programs, and various sorts of setting information. Although this embodiment assumes that the storage 304 is an auxiliary storage device such as an HDD, nonvolatile memory such as an SSD may be used instead of or in addition to the HDD.

Thus, the hardware such as the CPU 301, the ROM 302 and the RAM 303 constitute what is called a computer.

Although in the printer 103 in this embodiment the single CPU 301 uses the single memory (RAM 303) to perform processes to be described below, other configurations are also possible. For example, multiple CPUs, RAMs, ROMs and storages may cooperate to perform the processes to be described below. A hardware circuit such as an ASIC (Application Specific Integrated Circuit) or an FPGA (Field-Programmable Gate Array) may also be used to perform part of the processes.

An operation unit I/F 305 connects an operation unit 306 and the control unit 300. The operation unit 306 includes a liquid crystal display unit with a touch panel function, and various hardware keys. The operation unit 306 functions as a display unit that displays information, and as a reception unit that receives a user's instructions.

A scan unit I/F 307 connects a scan unit 308 and the control unit 300. The scan unit 308 scans a document to generate a scanned image. The scanned image generated is stored in the storage 304 or the RAM 303. The scanned image generated by the scan unit 308 may be transmitted to a communication apparatus or used for printing an image onto a sheet.

An image processing unit 314 has an RIP (raster image processor) function for decompressing print data received over the network and generating a print image. The image processing unit 314 can also change the resolution of the image or correct the image. Although this embodiment assumes that the image processing unit 314 is implemented as a hardware circuit (such as an ASIC or an FPGA), this is not limiting. For example, the printer 103 may include a processor for image processing, which may execute an image processing program to realize image processing and print data decompression processing. In this case, the processor for image processing and the CPU 301 cooperate to realize the processes to be described below. Further, the CPU 301 may be configured to execute an image processing program to perform image processing and print data decompression processing. Any combination of the above may be used to perform image processing.

A print unit I/F 309 connects a print unit 310 and the control unit 300. A print image resulting from analyzing print data by the image processing unit 314 is transferred from the control unit 300 to the print unit 310 via the print unit I/F 309. The print unit 310 receives a control command and the print image via the control unit 300, and according to the received image, prints the image onto a sheet fed from a sheet-feeding cassette (not shown). Printing by the print unit 310 may be electrophotographic printing or may be ink-jet printing. Other printing methods, such as thermal-transfer printing, may also be applied.

A sheet processing unit I/F 311 connects the control unit 300 and a sheet processing unit 312. The sheet processing unit 312 receives a control command from the CPU 301, and according to the control command, performs postprocessing on sheets printed by the print unit 310. For example, the sheet processing unit 312 performs postprocessing such as aligning multiple sheets, punching holes in the sheets, or binding the sheets. The control unit 300 is notified of the postprocessing functions and postprocessing capabilities of the sheet processing unit 312 via the sheet processing unit I/F 311 in advance (for example, upon activation of the printer 103). The postprocessing functions and postprocessing capabilities are then stored in the storage 304 or the RAM 303.

The control unit 300 is connected to the network 104 via a communication unit I/F 313. The communication unit I/F 313 transmits images and information to communication apparatuses in the network 104, and receives print data and information from communication apparatuses in the network 104.

With reference to FIG. 4, an exemplary software configuration of the terminals 106 will now be described.

FIG. 4 is a diagram illustrating an exemplary software configuration of each terminal 106.

The terminal 106 includes software such as applications 401, a print application 402, and an OS 403.

Multiple applications 401, such as a web browser, can be installed into the terminal 106. The applications 401 run either in the foreground, where a UI is displayed and executed, or in the background, where no UI is displayed. The applications 401 may be installed from external cloud services (not shown) over the network 104, or installed in advance into the OS 403 through management systems such as MDM (Mobile Device Management). In the example in FIG. 4, the print application 402, among the applications 401, is installed as an application that operates dedicatedly to printing in cooperation with a cloud service to be described below.

The OS 403 is software that executes applications and manages the entire resources. The OS 403 includes drivers 404 that control components such as the display and memory. A print module 405 is a module of the OS 403 and is called when printing is performed through the applications 401. The print module 405 includes units such as a rendering unit 407 that renders print data, and a print setting UI unit 408. The print module 405 may be AirPrint™ of Apple Inc., for example.

A communication module 406 is a module used by the applications 401 and the OS 403 for communication. The communication module 406 includes a pop-up unit 409 that displays a pop-up window for prompting the user to enter a user name and a password when an HTTP status code such as "HTTP 401 Unauthorized" is returned. "HTTP 401 Unauthorized" is a client error corresponding to an error indicating no authorization (failed authentication) and will hereinafter be referred to as an "authorization error."

Figure 5B:
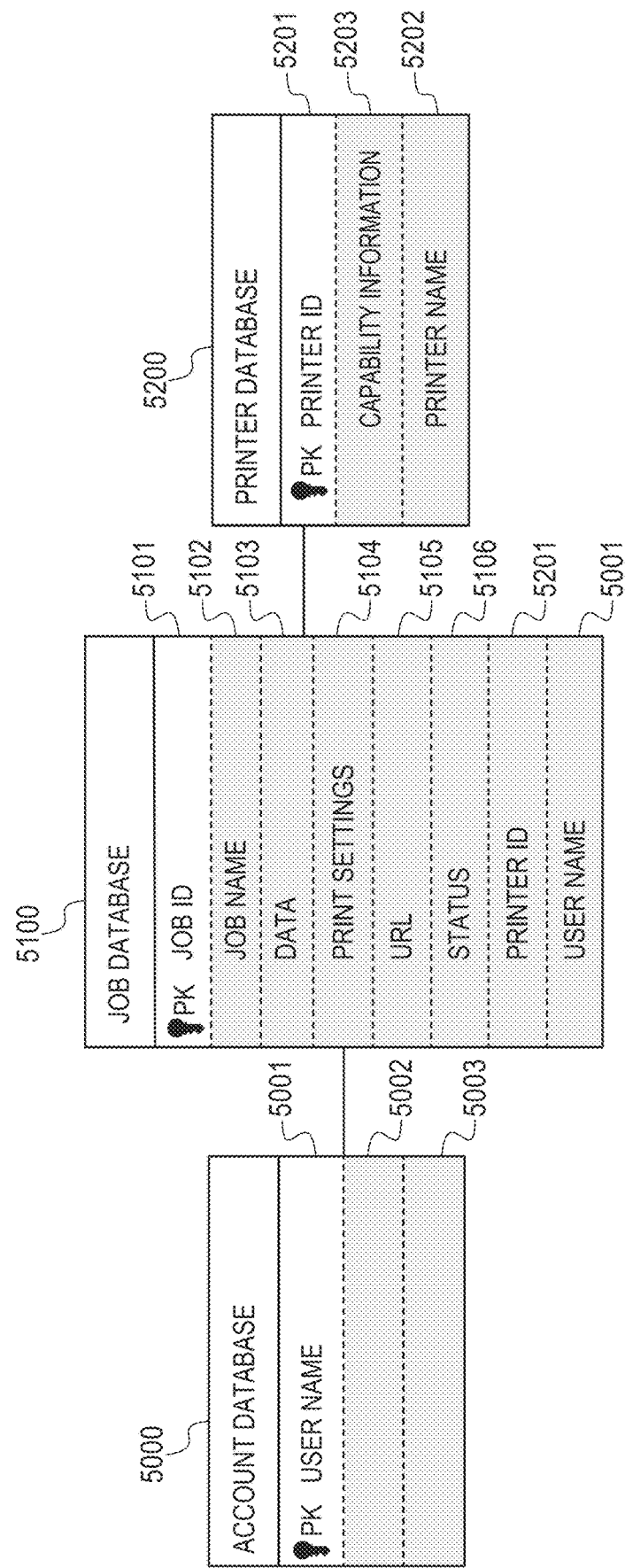
FIG. 5B is a diagram illustrating exemplary relationships among databases in the cloud service.

With reference to FIGS. 5A and 5B, the software configuration of the cloud server 102 will now be described.

FIG. 5A is a block diagram illustrating an exemplary software configuration of a cloud service 500 operating in the cloud server 102.

FIG. 5B is a diagram illustrating exemplary relationships among databases in the cloud service 500 operating in the cloud server 102.

First, the databases in the cloud service 500 will be described with reference to FIG. 5B.

The cloud service 500 has three databases: an account database 5000, a job database 5100, and a printer database 5200.

The account database 5000 has user name 5001 as a primary key used as an identifier, password 5002, and notification id 5003 used in notifying a user's terminal 106 or client computer 101.

The printer database 5200 has printer ID 5201 as a primary key, printer name 5202, and printer capability information 5203.

Data in the account database 5000 and the printer database 5200 are registered in advance of printing.

The job database 5100 is a database in which print data is registered each time printing is performed. The job database 5100 has job ID 5101 as a primary key. As other attributes, the job database 5100 has job name 5102, data for printing 5103, information about print settings made for the job 5104, URL (Uniform Resource Locator) 5105, status 5106, printer ID (identifier) 5201, and user name 5001. Printer ID 5201 and user name 5001 are foreign keys. Status 5106 stores a print data status, such as "registered," "now printing," or "printed."

The configuration of the cloud service 500 and a general flow will now be described with reference to FIG. 5A.

The cloud service 500 starts when a data reception unit 501 receives print data. The data reception unit 501 receives print data such as XPS or PDF data, in HTTP (Hyper Text Transfer Protocol) format, over the network 104. XPS stands for XML Paper Specification, and PDF stands for Portable Document Format.

Having received the print data, first, the data reception unit 501 queries an authentication service 502 whether authentication information in the print data is valid. The authentication service 502 acquires the authentication information from the print data and matches the authentication information with the account database 5000, thereby providing an authentication service. When the authentication succeeds, the authentication service 502 returns a response indicating success to the sender of the print data; when the authentication fails, the authentication service 502 returns a response indicating an authorization error to the sender. When the authentication succeeds, the data reception unit 501 passes the print data to a job management unit 503.

The job management unit 503 queues the print data. The job management unit 503 assigns a job ID to each print data item and registers the print data item in the job database 5100 along with other information such as the user name 5001. At this point, the job management unit 503 dynamically generates a URL 5105 of a linked destination where information about a print setting screen for editing the print data item (including modifying the print settings) can be acquired, and registers the URL as well. The job management unit 503 also changes the status 5106 to "registered."

After the print data is registered, a notification transmission service 504 transmits, based on the notification id in the account database 5000 associated with the print data, a notification that includes data in a format such as JSON (JavaScript™ Object Notation) to the relevant account. The notification here includes information such as the job ID 5101 and the URL 5105 in the job database 5100, a certain message indicating the completion of print job registration, and the identifier of the print application 402 to be used for accessing a print setting service 505. This notification is displayed on the display of a terminal 106 or the client computer 101, which is the recipient corresponding to the notification id. The notification transmission service 504 may provide this notification via, for example, Firebase™ Cloud Messaging (FCM) of Google LLC. In this case, the recipient corresponding to the notification id 5003 is registered in FCM in advance. This notification may also be provided using various other messaging methods, such as E-mail and Short Message Service (SMS).

The print setting service 505 is a service that allows print settings to be made for registered jobs. When the URL 5105 is accessed by the terminal 106 after the registration of the print data, the print setting service 505 acquires the print data from the job management unit 503 via a print setting unit 506, and acquires the capability information 5203 about the printer 103 from the printer database 5200. The print setting service 505 then returns, to the caller (in this example, the terminal 106), information (URL) about the print setting screen to be displayed in the print application 402. The print setting service 505 also transmits the edited print data (the print data for which the print settings have been modified) to the printer 103 after receiving a print instruction from the print application 402.

Figure 6:
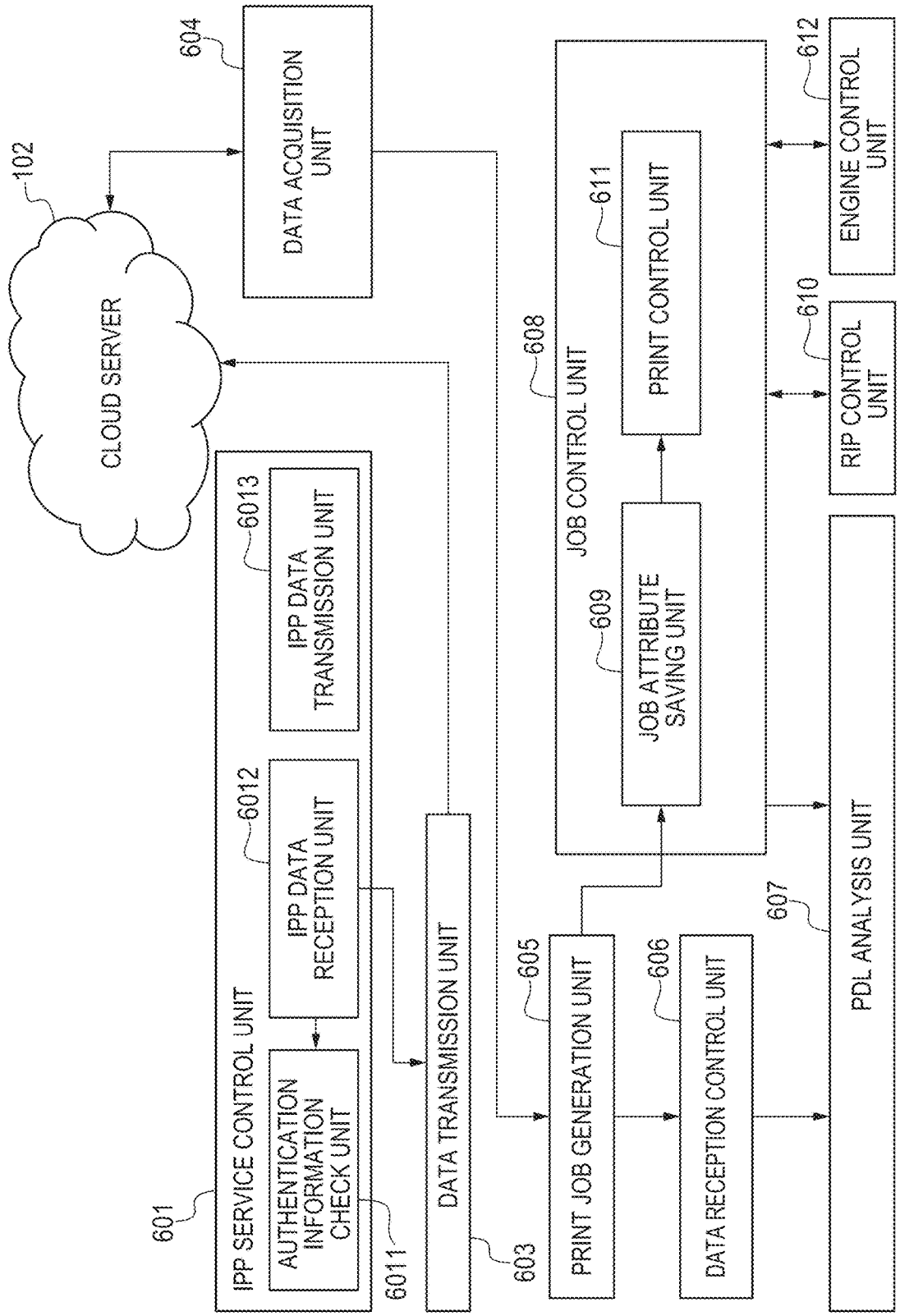
FIG. 6 is a diagram illustrating an exemplary software configuration of the printer.

FIG. 6 is a diagram illustrating an exemplary software configuration of each printer 103 in this embodiment. An IPP service control unit 601 is a web service that provides a web-based print service compliant with IPP (Internet Printing Protocol) to external terminals such as communication apparatuses. The IPP service control unit 601 notifies the terminals 106 of the attribute information about the printers 103 (information indicating the print capabilities and postprocessing capabilities of the printers 103), and receives IPP-compliant print data from the terminals 106 and passes the print data to a data transmission unit 603. The IPP service control unit 601 also checks the IPP-compliant print data for authentication information.

An IPP data transmission unit 6013 notifies the capability information about the printers 103 as requested. An IPP data reception unit 6012 receives the IPP-compliant print data and passes the print data to an authentication information check unit 6011. The authentication information check unit 6011 checks whether the print data includes authentication information.

Upon reception of the IPP-compliant print data, the data transmission unit 603 assigns printer ID information to the print data and transmits the print data to the cloud server 102.

A data acquisition unit 604 acquires print data and print setting information from the cloud server 102 and passes the print data to a print job generation unit 605.

Once the print job generation unit 605 generates a print job, the attributes of the print job are stored in a job attribute saving unit 609.

A data reception control unit 606 is a buffer area for the print data received by the print job generation unit 605. The received data is temporarily saved in the storage 304 on a print job basis.

When a specific print job becomes ready to be executed, a job control unit 608 instructs a PDL analysis unit 607 to perform a PDL analysis process for the specific print job.

The PDL analysis unit 607 requests print data corresponding to the specific print job from the data reception control unit 606. The data reception control unit 606 transfers the print data corresponding to the specific print job to the PDL analysis unit 607.

The PDL analysis unit 607 generates intermediate data based on the attribute information about the specific print job saved in the job attribute saving unit 609 (for example, the settings of the number of copies, N-up, color mode, and postprocessing) and based on the print data corresponding to the specific print job. The generated intermediate data is transferred to an RIP control unit 610.

The RIP control unit 610 cooperates with the RIP in the image processing unit 314 to convert the intermediate data into a raster image.

A print control unit 611 acquires the raster image generated by the RIP control unit 610 and transfers a print image resulting from CMYK (Cyan Magenta Yellow Black) color separation to an engine control unit 612.

With reference to FIGS. 7A to 7F, a screen configuration of the print setting UI unit 408 and the pop-up unit 409 in each terminal 106, and screen transitions before the start of printing, will be described below.

FIGS. 7A to 7F are schematic diagrams illustrating an exemplary UI of the terminal.

Figure 7A:
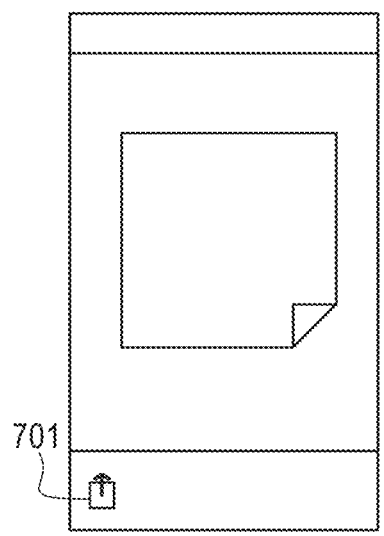
FIGS. 7A, 7B, 7C, 7D, 7E and 7F are schematic diagrams illustrating an exemplary UI of the terminal.

FIG. 7A illustrates a state in which a certain application 401 is started on the terminal 106. Pressing a menu button 701 causes a menu bar to be displayed.

Figure 7B:
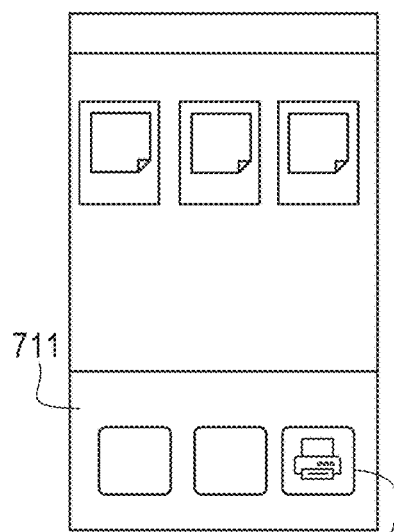

FIG. 7B illustrates a screen with the menu bar displayed. In the menu bar 711, buttons for selecting menu items are arranged side by side. Pressing a print button 712 among the menu items causes transition to a print screen shown in FIG. 7C.

Figure 7C:
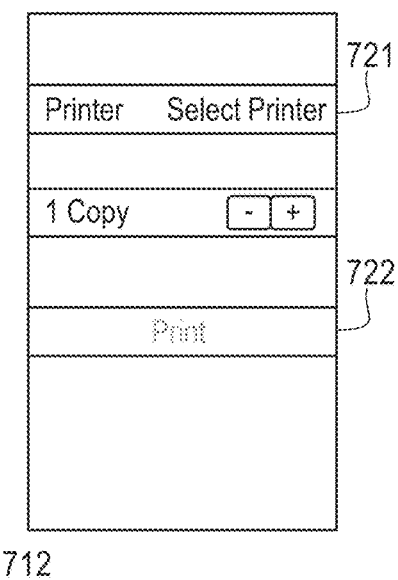

FIG. 7C illustrates the print screen. Pressing a Select Printer button 721 causes transition to a printer selection screen shown in FIG. 7D. Pressing a Print button 722 on the print screen causes printing to be performed, while the Print button 722 is grayed out in this screen because no printer has been selected yet.

Figure 7D:
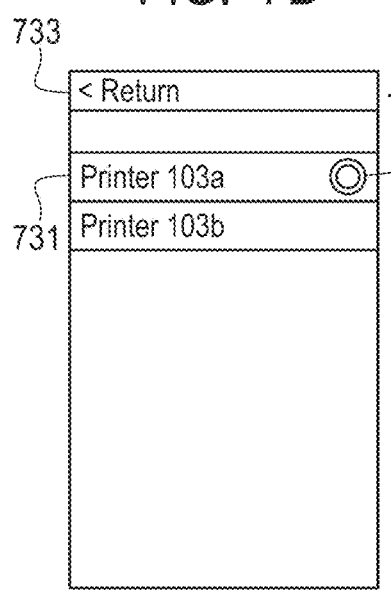

FIG. 7D illustrates the printer selection screen. Once the printer selection screen is displayed, the terminal 106 searches for printers in the network in which the terminal 106 resides, and displays the list 731 of available printers in the network. Selecting the printer 103a in the printer list 731 causes a mark 732 to be displayed indicating that the printer is selected. Pressing a Return link 733 causes transition to the print screen shown in FIG. 7E having the printer selected.

Figure 7E:
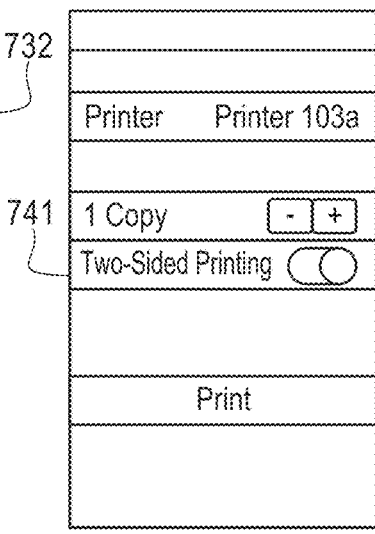

FIG. 7E illustrates the print screen having the printer selected. The capability information about the printer 103a is acquired, so that a two-sided printing UI 741 is displayed. The functions displayed are not limited to two-sided printing but may include any IPP-compliant function supported by the terminal 106. Since the printer is selected, the Print button 722 on this screen is no longer grayed out and therefore can be pressed. Pressing the Print button 722 causes the print setting UI unit in the print module to render print data, which is then transmitted by the communication module 406 to the printer 103a.

Figure 7F:
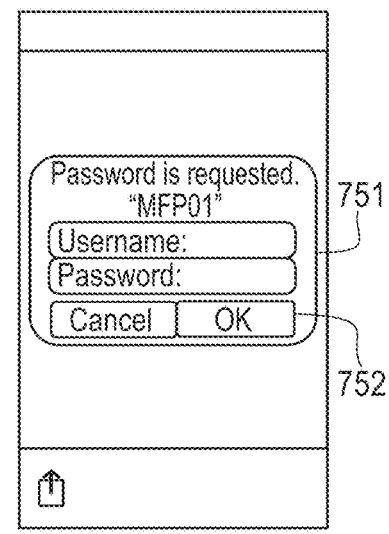

FIG. 7F illustrates a UI displayed by the pop-up unit 409. If an authentication error is returned from the printer 103a in response to the transmission of the print data to the printer 103a, a pop-up window 751 is popped up by the pop-up unit 409. The pop-up window 751 is a window for entering user information including the user name and the password. Inputting the user name and the password to the pop-up window 751 and then pressing an OK button 752 causes the communication module 406 to retransmit the print data to the printer 103a. This time, the user name and the password (authentication information) entered on the pop-up window 751 is attached to the print data, which is then transmitted.

Figure 8:
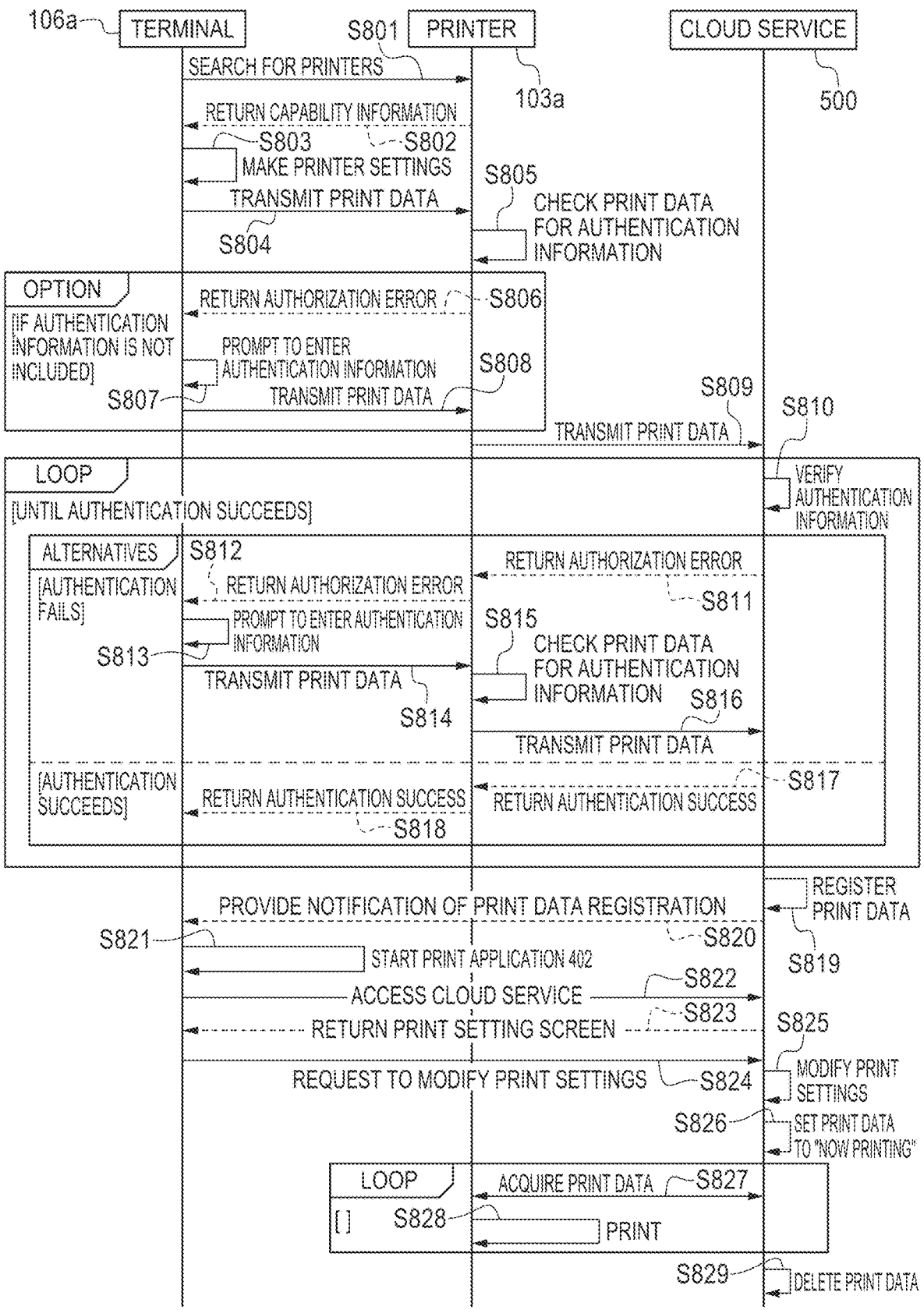
FIG. 8 is a sequence diagram illustrating the flow of a print process in the print system in the embodiment.

With reference to FIG. 8, the flow of printing in this embodiment will be described below.

FIG. 8 is a sequence diagram illustrating the flow of a print process in the print system in this embodiment. Although the description of the example in FIG. 8 takes the terminal 106a, the description equally applies to the terminal 106b or the client computer 101. Also, although the description takes the printer 103a, the description equally applies to the printer 103b.

First, as described regarding FIGS. 7A and 7B, when the print button 712 is pressed after a certain application 401 is started on the terminal 106a, the terminal 106a transitions to the print screen (FIG. 7C). Once the Select Printer button 721 is pressed on the print screen (FIG. 7C), the terminal 106a transitions to the printer selection screen (FIG. 7D) and searches for printers (s801).

The printers 103a and 103b receive a search request from the terminal 106a and return the printer capability information (s802).

Based on the responses from the printers 103a and 103b, the terminal 106a displays the list 731 of available printers on the printer selection screen (FIG. 7D). When a printer (which is 103a here, but may be 103b) is selected from the printer list 731 and the Return link 733 is pressed, the terminal 106a transitions to the print screen (FIG. 7E) and receives print settings (s803). Then, when the Print button 722 is pressed, the terminal 106 transmits print data related to the above-mentioned application 401 to the printer 103a (s804). For example, print data as in FIG. 10A to be described below is transmitted here.

The printer 103a receives the print data through the IPP data reception unit 6012 and checks for the authentication information through the authentication information check unit 6011 (s805).

When the HTTP header of the print data includes the authentication information (the user name and the password), the authentication information check unit 6011 simply transmits the print data to the cloud service 500 (s809).

By contrast, when the HTTP header of the print data does not include the authentication information, the printer 103a returns an authorization error (HTTP 401 Unauthorized) to the terminal 106a (s806). For example, a packet as in FIG. 10B to be described below is returned here.

When the terminal 106a receives the authorization error, the pop-up unit 409 displays the pop-up window as shown in FIG. 7F to prompt the user to enter the authentication information (the user name and the password) (s807).

Once the authentication information is entered in the pop-up window, the terminal 106a transmits, to the printer 103a, the print data in which the HTTP header includes the entered authentication information (s808). For example, print data as in FIG. 10C to be described below is transmitted here. The printer 103a receives the print data through the IPP data reception unit 6012 and checks for the authentication information through the authentication information check unit 6011. Because the HTTP header of the print data now includes the authentication information, the printer 103a having received the print data simply transmits the print data to the cloud service 500 (s809).

The cloud service 500 receives the print data through the data reception unit 501 and passes the data to the authentication service 502 to verify the authentication information (s810). The authentication service 502 authenticates the user by matching the data with the account database 5000.

When the authentication fails at s810 above, the authentication service 502 returns an authorization error (s811).

The printer 103a having received the authorization error simply returns the authorization error to the terminal 106a (s812).

On the terminal 106a having received the authorization error, the pop-up unit 409 displays the pop-up window as shown in FIG. 7F to prompt the user to reenter the authentication information (s813).

After receiving the entry of the authentication information, the terminal 106a retransmits, to the printer 103a, the print data in which the HTTP header includes the entered authentication information (s814). For example, print data as in FIG. 10C to be described below is transmitted here.

The printer 103a receives the retransmitted print data and checks whether the packet of the print data includes the entered authentication information (s815). If so, the printer 103a transmits the print data to the cloud service 500 (s816). For example, print data as in FIG. 10C to be described below is transmitted here.

When the authentication succeeds at s810 above, the cloud service 500 returns a response indicating successful authentication to the printer 103a (s817).

The printer 103a simply returns the response indicating successful authentication to the terminal 106a (s818).

The data reception unit 501 of the cloud service 500 passes the successfully authenticated print data to the job management unit 503. The job management unit 503 assigns the job ID 5101 to the print data and generates the URL 5105, and then registers the print data in the job database 5100 (s819).

After the successful authentication, the job management unit 503 also causes the notification transmission service 504 to provide a notification to the terminal 106a based on the notification ID in the account database 5000 (s820). The notification here includes the job ID 5101, the URL 5105, the identifier of the print application 402, and a text message indicating the completion of registration of the print data in the job database 5100.

The terminal 106a receives the notification from the cloud service 500 and displays a notification, for example as shown by 901 in FIG. 9A to be described below. Upon receiving an event such as a click or tap on the notification, the terminal 106a starts the print application 402 corresponding to the notification (s821). The terminal 106a also starts the print application 402 upon receiving an event such as a click or tap on an icon 902 in FIG. 9A to be described below. The started print application 402 accesses the print setting service 505 of the cloud service 500 (s822).

Having accessed by the print application 402, the print setting service 505 queries the job management unit 503 to acquire a print job from the job database 5100. The print setting service 505 also refers to the printer database 5200 and returns the print setting screen to the print application 402 (s823).

The print application 402 receives the response returned at s823 above and displays a print setting UI, for example as in FIG. 9B to be described below. While the print setting UI is displayed, the print application 402 receives user operations to modify print settings (as necessary). When a Print button as shown by 912 in FIG. 9B is operated, e.g., touched, the print application 402 requests the cloud service 500 to modify the print settings (s824). At s824, the print application 402 requests the cloud service 500 that printing be performed according to the print settings made in the print setting UI (a print request).

The cloud service 500 receives the request issued at s824 above and modifies the print settings for the job specified in the request (s825). After modifying the print settings, the cloud service 500 changes the status 5106 of the specified job in the job database 5100 to "now printing" (s826).

The printer 103*a* is querying the cloud service 500 by polling. When any data item in the cloud service 500 has the printer ID 5201 corresponding to the printer 103*a* and the status 5106 set to "now printing" in the job database 5100, the printer 103*a* acquires this print data indicated as "now printing" (s827). The printer 103*a* also acquires the print settings for the print data. After acquiring the print data, the printer 103*a* prints the print data (s828). Alternatively, the cloud service 500 may push-transmit the print data (including the print settings) with its status 5106 set to "now printing" in the job database 5100 to the printer 103*a* identified by the printer ID 5201.

After the printer 103*a* acquires the print data, the cloud service 500 changes the status 5106 of the print data in the job database 5100 to "printed." The cloud service 500 further deletes the job data with its status 5106 set to "printed" from the job database 5100 and deletes the print data itself corresponding to the deleted job data (s829).

Figure 9A:
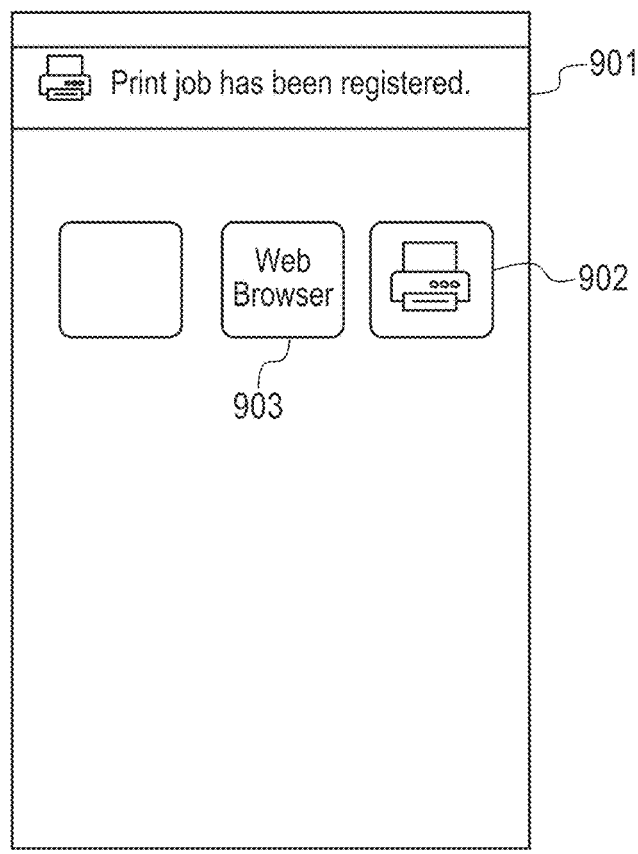
FIGS. 9A and 9B are schematic diagrams illustrating an exemplary UI of the terminal.
Figure 9B:
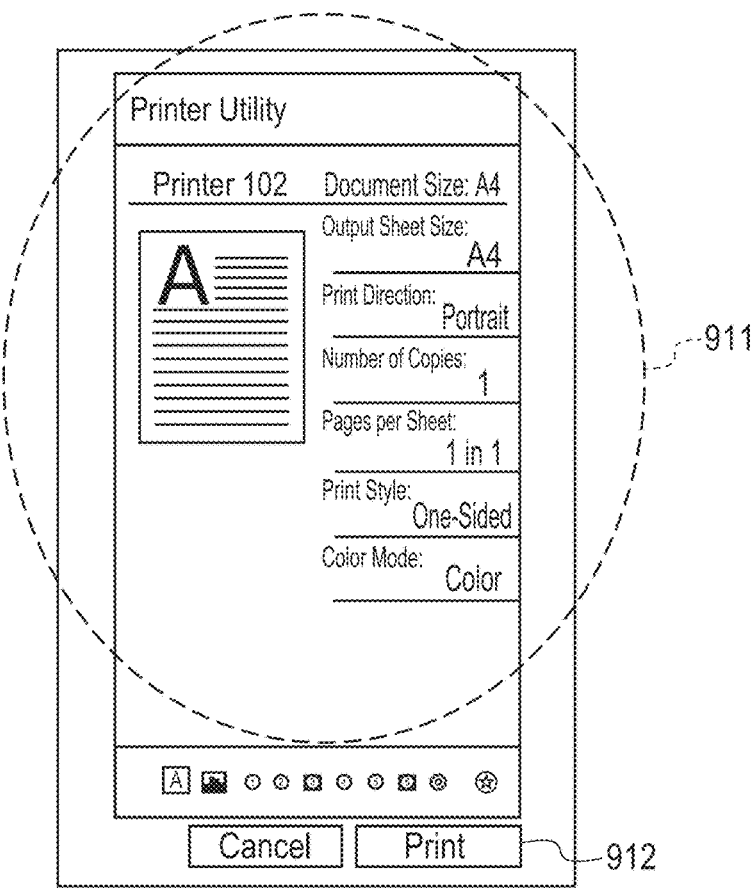

With reference to FIGS. 9A and 9B, operations of the print application 402 will be described below.

FIG. 9A is a schematic diagram illustrating an exemplary menu screen of the terminal 106*a*.

Icons (such as 902 and 903) representing the installed applications 401 are disposed on the menu screen of the terminal 106*a*. A notification 901 is displayed on the menu screen of the terminal 106*a* upon reception of the notification at s820 in FIG. 8 from the notification transmission service 504 of the cloud service 500.

The notification 901 is exemplary display of the notification received from the notification transmission service 504 of the cloud service 500. Pressing the notification 901 causes the print application 402 to be started.

The icon 902 represents the print application 402. Pressing the icon 902 causes the print application 402 to be started.

When the terminal 106 has received a notification corresponding to the notification 901, the started print application 402 accesses the URL written in the notification to acquire, from the cloud service 500, information about the print setting screen necessary for making print settings. The information acquired here may also include, for example, a layout in HTML, CSS, or JavaScript™, in addition to the print setting information and print job information. Therefore, instead of starting the print application 402, a web browser may be started for displaying the print setting screen and used as an alternative. The icon 903 represents a web browser. Pressing the icon 903 causes the web browser to be started.

FIG. 9B is a schematic diagram illustrating an exemplary print setting screen displayed by the print application 402.

The print setting screen shown in FIG. 9B has a print setting section 911, where user operations can be received to make more detailed print settings than in FIG. 7E. The print settings that can be made in the print setting section 911 do not necessarily have to be IPP-compliant but may include the printer vendor's original print settings registered in the printer database 5200.

After the print settings are modified (as necessary), pressing a Print button 912 confirms printing and causes the process to transition to the step of s824 in FIG. 8.

With reference to FIGS. 10A to 10C, packet structures used in transmitting the print data will be described below.

FIG. 10A is a diagram illustrating an exemplary structure of the print data transmitted at s804 in FIG. 8. The print data in FIG. 10A is IPP-compliant, and includes an HTTP header part and a body part as shown by 1001 and 1002. The HTTP header part defines an HTTP method, which is, in the example of FIG. 10A, POST for transmitting the print data. The body part includes print data and print setting information.

FIG. 10B is a diagram illustrating an exemplary packet of the authorization error response at s806, s811, and s812 in FIG. 8.

As shown by 1011, the error code "401" indicating an authorization error and the text "Unauthorized" indicating an authorization error are written in the header part of the packet shown in FIG. 10B.

FIG. 10C is a diagram illustrating an exemplary packet used in transmitting the print data having the authentication information attached.

In the packet shown in FIG. 10C, the authentication information entered at s807 and s813 in FIG. 8 is added to the header part as shown by 1021. This packet is used at s808, s814, and s816 in FIG. 8. The body part is the same as in FIG. 10A.

As above, for a print job to be printed according to IPP, an error is returned when user information is not attached to the print job. An OS is caused to display an entry screen that prompts a user to enter the user information, and the entered user information is attached to the print job. Thus, even if printing is to be performed through a print system based on an OS that does not support IPP attributes for user identification, the cloud server 102 accumulating print jobs can identify the user corresponding to each print job. The cloud server 102 can accordingly notify the terminal of the user corresponding to the print job that the print job has been registered. The user can also access the cloud server 102 through the terminal to modify the print settings for the user's print job, including not only IPP-compliant print settings but also the printer vendor's original print settings.

The above description takes an example in which the print module, which may be AirPrint™ of Apple Inc., is included in the OS. However, the print module does not necessarily have to be included in the OS. The print module may be, for example, Mopria™ installable into Android™ of Google LLC and Windows™ of Microsoft Corporation.

It is to be understood that the above-described structures and details of data items are not limiting, and various structures and details may be adopted according to applications and purposes.

While an embodiment has been described above, the present disclosure may have aspects such as, for example, a system, an apparatus, a method, a program and a storage medium. Specifically, the present disclosure may be applied to a system implemented as multiple devices or to an apparatus implemented as a single device.

Combinations of the above examples are all included in the present disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-117110, filed Jun. 25, 2019, which is hereby incorporated by reference herein in its entirety.

What is claimed is:

1. A printing apparatus comprising:
   a first reception unit that receives data of an image to be printed from an information processing apparatus;
   a control unit that returns a response indicating authentication failure to the information processing apparatus when neither a user name nor a password is received with the data of the image so that a user of the information processing apparatus is enabled to input both a user name and a password, and that does not return a response indicating authentication failure to the information processing apparatus when a user name and a password are received with the data of the image even if the password is not correct for the user name;
   a second reception unit that receives a response to the response from the information processing apparatus, wherein the received response includes both the user name and the password input by the user; and
   an association unit that associates the received user name and password with the data of the image.

2. The printing apparatus according to claim 1, further comprising a print unit that, in a case where a print request to print the data of the image is issued to a server system by a user corresponding to the user name and password, acquires the data of the image from the server system and prints the data of the image without further user operation at the printing apparatus.

3. The printing apparatus according to claim 1, wherein the response indicating authentication failure is an HTTP 401 Unauthorized response.

4. The printing apparatus according to claim 1, wherein the server system accepts, from the user corresponding to the user name and password, a modification to a print setting for the print data.

5. The printing apparatus according to claim 1, wherein the response to the response does not include the data of the image, but includes the user name and password.

6. A method comprising:
   receiving data of an image to be printed from an information processing apparatus;
   performing control in which a response indicating authentication failure is returned to the information processing apparatus when neither a user name nor a password is received with the data of the image so that a user of the information processing apparatus is enabled to input both a user name and a password, and that does not return a response indicating authentication failure to the information processing apparatus when a user name and a password are received with the data of the image even if the password is not correct for the user name;
   receiving a response to the response from the information processing apparatus, wherein the received response includes both the user name and the password input by the user; and
   associating the received user name and password with the data of the image.

7. The method according to claim 6, further comprising, in a case where a print request to print the data of the image is issued to a server system by a user corresponding to the user name and password, acquiring the data of the image from the server system and printing the data of the image without further user operation.

8. The method according to claim 7, wherein the server system accepts, from the user corresponding to the user name and password, a modification to a print setting for the print data.

9. The method according to claim 6, wherein the response indicating authentication failure is an HTTP 401 Unauthorized response.

10. The method according to claim 6, wherein the response to the response does not include the data of the image, but includes the user name and password.

* * * * *